Feb. 2, 1965 F. W. ROBERTS ETAL 3,168,621

REMOTE DICTATION APPARATUS

Filed Sept. 14, 1961

INVENTORS
FREDERICK W. ROBERTS
DOUGLAS E. TAYLOR
JOSEPH A. RESCSANSKI
BY
Curtis, Morris + Safford
ATTORNEYS

3,168,621
REMOTE DICTATION APPARATUS

Frederick W. Roberts, Fairfield, Douglas E. Taylor, Westport, and Joseph A. Rescsanski, Trumbull, Conn., assignors to Dictaphone Corporation, Bridgeport, Conn.

Filed Sept. 14, 1961, Ser. No. 138,176
7 Claims. (Cl. 179—6)

This invention relates to remote-dictation systems wherein a number of dictating stations, consisting of telephone instruments or the like, are connected over a common voice circuit to a central recording apparatus, e.g. as disclosed in U.S. Patent 2,882,346. More in particular, this invention relates to improvements in "privacy" arrangements for assuring exclusive use of the voice circuit by the first dictator to seize the system.

In systems such as shown in the above patent, each dictator's instrument is provided with a "privacy relay" which is normally de-energized, and the normally-closed contacts of which are connected in series with the voice circuit leading from the microphone to the recording apparatus. When the first dictator lifts his telephone handset out of the cradle to start dictation, the operation of the usual cradle switch completes a connection to the voice circuit. The resulting flow of current in this circuit activates a control circuit which energizes the privacy relays at all of the dictator's instruments except the instrument then in use, and the contacts of these relays thereupon open to prevent any connection to the voice circuit. Therefore, if a dictator at one of these other stations subsequently picks up his handset to start dictation, no connection can be established from that instrument to the voice circuit until the dictator then using the system hangs up.

Under some actual operating conditions, it has been found that dictators awaiting use of a system sometimes will keep the handset out of the cradle, e.g. by placing it on their desk, in order to insure priority of access to the voice circuit when the present user hangs up. This practice has created a problem, since if two dictators thus remove their handsets, the voice circuit will be connected to the microphones of both when the present user hangs up. Hence it is possible that the messages of both dictators will be recorded simultaneously, with the result that the transcribing secretary will be unable to decipher either message.

The present invention solves this problem by a unique and simple latch arrangement which operates, in the event a dictator lifts his handset from the cradle while another dictator is on the line, to lock the privacy relay of the waiting dictator into energized position. Thus, when the present user of the system hangs up, the waiting dictator cannot gain access to the voice circuit without again operating the handset cradle to release mechanically the privacy relay latch. Accordingly, the invention effectively eliminates the possibility that two dictators can seize the system simultaneously. Other objects, aspects and advantages of the invention will be apparent from the following description and drawings, in which:

Figure 1:
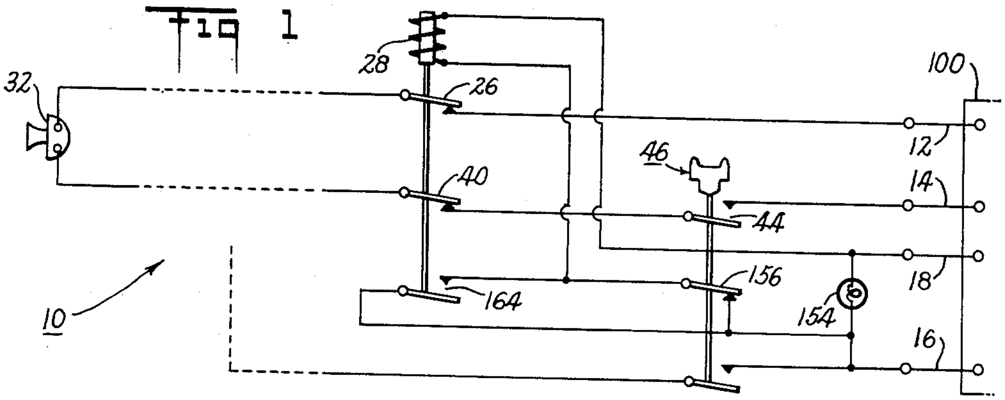
FIGURE 1 is a circuit diagram showing a remote dictator's instrument connected to centrally-located recording and control apparatus.
Figures 2, 3:
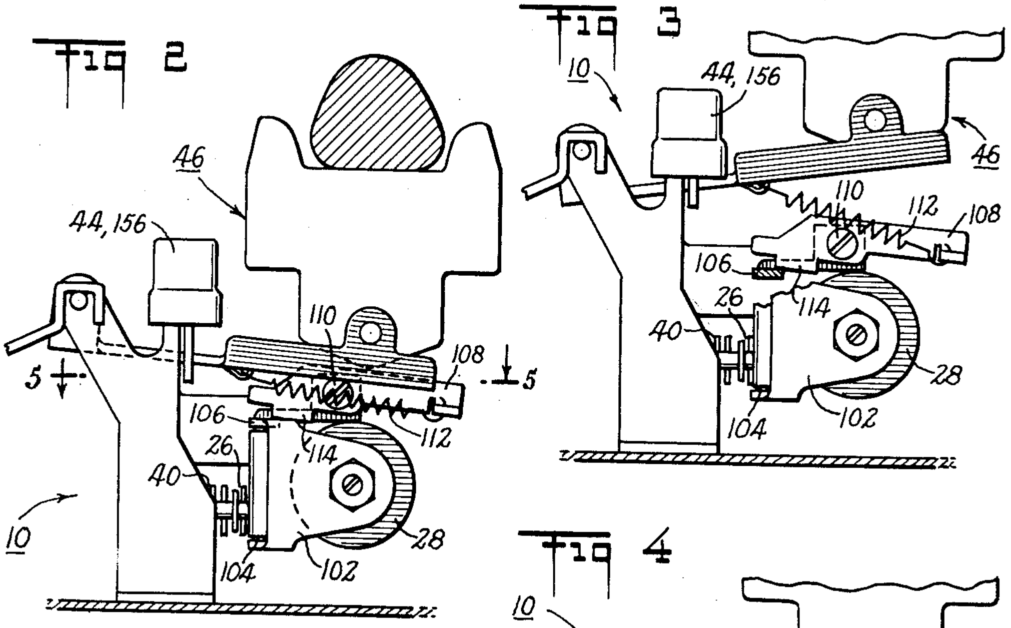
FIGURE 2 is a side elevation of interior parts of the dictator's instrument, showing the positioning of the relay latch mechanism with the handset in the cradle.
FIGURE 3 is a view similar to FIGURE 2, but showing the latch when the handset is out of the cradle and the relay de-energized.
Figure 4:
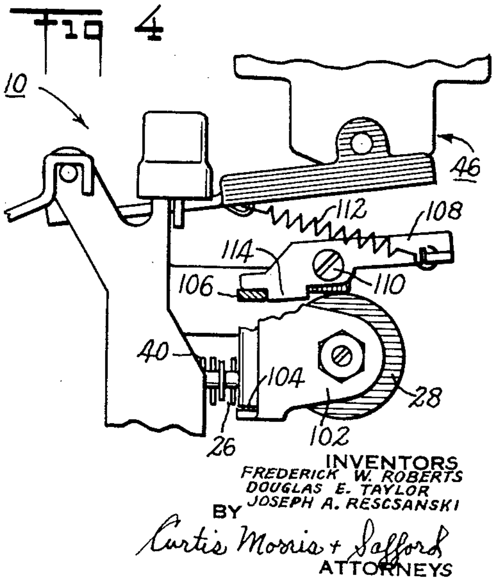
FIGURE 4 is a view similar to FIGURE 3, but with the relay energized.
Figure 5:
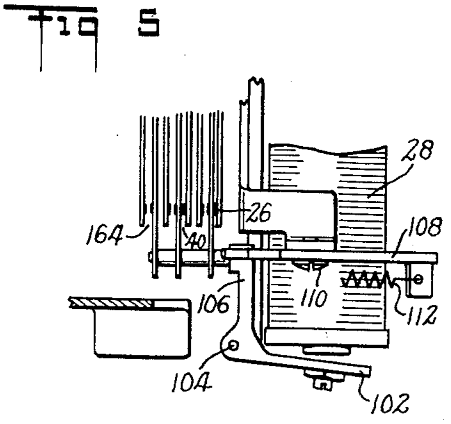
FIGURE 5 is a horizontal section taken along line 5—5 of FIGURE 2.

For reference purposes, it should be noted that the circuit of FIGURE 1 herein is a simplified version of the circuit shown in FIGURE 2 of U.S. Patent 2,882,346, and the same identifying numbers have been used for corresponding parts. Turning now to FIGURE 1, the dictator's instrument is generally indicated at 10 and includes a microphone 32 the terminals of which are connectible through switches 26, 40 and 44 to a voice circuit 12, 14 leading to the centrally-located recording and control equipment 100. Switches 26 and 40 are normally closed when the system is not in operation. Thus, when switch 44 is closed by a dictator lifting his handset from the cradle 46, the voice circuit connection is completed from the microphone to the central equipment 100.

As explained in the above-mentioned Patent 2,882,346, when this voice circuit connection is completed, current flows through conductors 12 and 14 and operates relay means in the apparatus 100 to apply energizing potential to a control circuit 16 and 18. This energizing potential lights a lamp 154 and in each dictator's instrument to show that the system is in use and thus unavailable to the other dictators. In addition, in all instruments except the one then in use, this energizing potential is applied through a switch 156 to the privacy relay 28. The resultant energization of this relay opens switches 26 and 40 to prevent connection between the corresponding microphone 32 and the voice circuit 12 and 14, and thus to assure that the first dictator will have exclusive use of the dictation system.

Energization of the privary relay 28 also closes a hold-in contact 164 between control line 16 and the lower end of the relay winding. It will be apparent that if a dictator waiting to gain access to the voice circuit 12 and 14 lifts up his handset and thereby opens cradle switch 156, the privary relay 28 will be maintained energized through this contact 164.

Referring now to FIGURES 2–5, it will be seen that the privacy relay 28 includes the usual armature 102 which is pivoted at 104 for movement towards and away from the relay core. The armature also is formed with a right-angled extension which serves as a switch-actuating arm 106 to control switches 26, 40 and 164.

Immediately above the privacy relay 28 is a latch 108 which is pivotally mounted at 110 and controlled through a spring 112 secured to the handset cradle 46. When the cradle is in its lower position (FIGURE 2), the spring extends below pivot axis 110 so that the spring force tends to rotate latch 108 clockwise, i.e. away from the switch arm 106. However, when the cradle is in its upper position with the handset out (FIGURES 3 and 4), the spring shifts to a position above pivot axis 110, and thus applies a counterclockwise torque to the latch.

If the handset is lifted from the cradle 46 while the privacy relay 28 is de-energized as shown in FIGURE 3, the counterclockwise torque applied by spring 112 merely presses the tab 114 of the latch down against the upper edge of the switch arm 106, and thus does not interfere with the movement of this arm. However, if the relay is energized at the time the handset is lifted (FIGURE 4), the switch arm 106 will have been moved out from underneath the tab 114. This tab therefore will shift down alongside the arm 106 and thus prevent movement of this arm away from switches 26, 40 and 164. Consequently, the relay will be locked in the energized position, even though current to the relay winding subsequently is cut off.

Accordingly, if the remote dictation system is in use, and a waiting dictator attempts to gain priority of access to the recording apparatus 100 by removing his handset from cradle 46, the latch 108 will lock the privacy relay 28 in its energized position. Subsequently, when the using dictator hangs up and thereby cuts off current to the relay winding, the relay switch arm 106 will remain in energized position with the switches 26 and 40 open. Therefore the waiting dictator cannot obtain a connection to the voice circuit 12 and 14 until he presses the cradle 46 down to its lower position to release the latch 108 and permit the relay arm 106 to return to its normal position.

It will be apparent from the above description that the present invention effectively eliminates any possibility that two or more waiting dictators might be connected to the voice circuit simultaneously, as could occur with previous privacy arrangements if the handsets of the waiting dictators were out of their cradles when the dictator using the system hung up his handset. With the present invention, none of the waiting dictators would automatically be connected to the voice circuit when the previous dictator finished his dictation, and the first one thereafter to operate his cradle switch will gain exclusive use of the recording apparatus.

Although a specific preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. A remotely-operated dictation system which includes centrally-located recording and control apparatus, a plurality of remote dictator's instruments each including a microphone, circuit means providing communication paths between said microphones and said recording apparatus, on-off switch means at each instrument and operable when in the "on" position to complete the respective communication path to said recording apparatus; privacy means at each instrument and effective, in response to the completion of a communication path to one of said instruments, to prevent the completion of communication paths to the other of said instruments; and privacy lock-in means at each instrument under the control of the on-off switch means at the corresponding instrument, each of said lock-in means including means connected to the privacy means at the corresponding one of said other instruments and operable by said on-off switch means to maintain that privacy means in effective condition as long as the on-off switch at said corresponding instrument is in "on" position.

2. Remote dictation apparatus comprising centrally-located recording and control apparatus, a plurality of dictator's instruments each including a microphone, a voice circuit for coupling said instruments to said recording apparatus, on-off switch means at each instrument for completing a connection to said voice circuit when placed in "on" position, a privacy relay at each instrument for interrupting the connection to said voice circuit when the relay is in its effective position; privacy control means operable, when a connection has been made at one instrument to said voice circuit, to maintain the privacy relays at the other instruments in effective position; privacy lock-in means at each instrument, and operating means at each instrument responsive to the actuation of the corresponding on-off switch means and connected to said lock-in means, said lock-in means being actuated by said operating means, in response to the on-off switch at that corresponding instrument being placed in its "on" position while said privacy control means is in operated condition, to hold the respective privacy relay in its effective position.

3. Remote dictation apparatus comprising centrally-located recording and control apparatus, a plurality of dictator's instruments each including a microphone, a voice circuit for coupling said instruments to said recording apparatus, on-off switch means at each instrument for completing a connection to said voice circuit when the switch is placed in its "on" position; a privacy relay at each instrument and adapted when energized to interrupt the connection to said voice circuit, privacy control means responsive to the completion of a connection between one of said instruments and said voice circuit and operable thereby to energize the privacy relays at all of the other instruments; and a latch coupled to the on-off switch means at each instrument and movable therewith, said latch being shiftable by said on-off switch means into position to block the release of the corresponding privacy relay from its operated position if the respective on-off switch is placed in its "on" position while the corresponding relay is energized.

4. For use with remote dictation systems, a dictator's instrument comprising a telephone handset having a microphone, switch means operable to connect the dictator's instrument to a voice circuit, a privacy relay having effective and ineffective positions and arranged to interrupt the connection to said voice circuit when in said effective position, latch means actuable into a position engaging said privacy relay to maintain it in said effective position, and operating means coupled to said switch means to be controlled thereby, said operating means being connected to said latch means and operable to shift said latch means into said position engaging said privacy relay when said switch means is moved to "on" position while said privacy relay is in said effective position.

5. Apparatus as claimed in claim 4, wherein said instrument includes a cradle adapted to receive the telephone handset, said switch means being operable by the movement of said handset into and out of the cradle, said latch means also being actuable by the movement of the handset into and out of the cradle.

6. Apparatus as claimed in claim 5, wherein said cradle is shiftable up and down to operate the switch means when the handset is removed or replaced, said latch means being coupled to said cradle.

7. Apparatus as claimed in claim 6, wherein said latch means includes a pivoted lever adapted in one position to engage the privacy relay, and a spring interconnecting said cradle with said lever for producing operation thereof as the cradle shifts up or down, said spring extending on one side of the pivot axis in one position of the cradle and on the other side of the pivot axis in the other position of the cradle, thereby tending to rotate the lever clockwise in one position and counterclockwise in the other position.

References Cited in the file of this patent

UNITED STATES PATENTS

| | | |
|---|---|---|
| 2,820,852 | Jones et al. | Jan. 21, 1958 |
| 2,955,241 | Schleicher | Oct. 4, 1960 |

UNITED STATES PATENT OFFICE

CERTIFICATE OF CORRECTION

Patent No. 3,168,621 February 2, 1965

Frederick W. Roberts et al. .

It is hereby certified that error appears in the above numbered patent requiring correction and that the said Letters Patent should read as corrected below.

Column 2, line 72, strike out "cut off." and insert the same after "is" in line 70, same column 2.

Signed and sealed this 10th day of August 1965.

(SEAL)
Attest:

ERNEST W. SWIDER
Attesting Officer

EDWARD J. BRENNER
Commissioner of Patents